US009977160B1

(12) United States Patent
Stenger et al.

(10) Patent No.: US 9,977,160 B1
(45) Date of Patent: May 22, 2018

(54) OPTICAL ASSEMBLY FOR PROTECTION OF OPTICAL DEVICES

(71) Applicant: Gooch and Housego PLC, Ilminster, Somerset (GB)

(72) Inventors: Thomas E. Stenger, Bedford, OH (US); Carl D. Brunetta, Mayfield, OH (US); Robert W. Dew, Lyndhurst, OH (US); Gary C. Catella, Chagrin Falls, OH (US)

(73) Assignee: Gooch and Housego PLC, Somerset (GB)

( * ) Notice: Subject to any disclaimer, the term of this patent is extended or adjusted under 35 U.S.C. 154(b) by 105 days.

(21) Appl. No.: 14/706,384

(22) Filed: May 7, 2015

Related U.S. Application Data

(60) Provisional application No. 62/066,714, filed on Oct. 21, 2014.

(51) Int. Cl.
| | | |
|---|---|---|
| *G02B 5/20* | (2006.01) | |
| *G02B 7/00* | (2006.01) | |
| *G02B 5/00* | (2006.01) | |
| *G02B 1/02* | (2006.01) | |
| *G02B 1/11* | (2015.01) | |
| *H01S 3/00* | (2006.01) | |

(52) U.S. Cl.
CPC .............. *G02B 5/208* (2013.01); *G02B 1/02* (2013.01); *G02B 1/11* (2013.01); *G02B 5/005* (2013.01); *G02B 7/006* (2013.01); *H01S 3/005* (2013.01)

(58) Field of Classification Search
CPC .......... G02B 5/208; G02B 5/207; G02B 1/02; G02B 1/11; G02B 5/005; G02B 7/006; G02B 5/20; G02B 7/00; H01S 3/005; H01S 3/0064; H01S 3/02; G02F 2001/3505
USPC ............................ 359/350–361, 892; 372/92
See application file for complete search history.

(56) References Cited

U.S. PATENT DOCUMENTS

| | | | | |
|---|---|---|---|---|
| 3,464,534 A | * | 9/1969 | Muncheryan | ......... B08B 7/0042 15/3.53 |
| 5,680,412 A | | 10/1997 | DeMaria et al. | |
| 6,784,399 B2 | * | 8/2004 | Dunsky | .................. B28D 1/221 219/121.68 |

(Continued)

OTHER PUBLICATIONS

"Wien's Displacement Law and Other Ways to Characterize the Peak of Radiation", Georgia State University, Department of Physics and Astronomy, Atlanta, Georgia, 2001, http://hyperphysics.phy-astr.gsu.edu/hbase/quantum/wien3.html.

(Continued)

*Primary Examiner* — Ricky Mack
*Assistant Examiner* — Kristina Deherrera
(74) *Attorney, Agent, or Firm* — Jetter & Associates, P.A.

(57) ABSTRACT

An optical device includes an optical assembly having a housing, a first end window, and a second end window. The first and second end window together with the housing provide an enclosed volume for a protected optical device including an optical material. A material for the end windows blocks essentially all non-pass band light having sufficient energy to generate absorption phenomena in the optical material while transmitting essentially all of operational wavelength light (pass band light) for the optical device. A material for the housing also blocks essentially all the non-pass band light from reaching the optical material.

10 Claims, 3 Drawing Sheets

(56) References Cited

U.S. PATENT DOCUMENTS

| | | | |
|---|---|---|---|
| 8,164,827 B2* | 4/2012 | Robinson | G01J 5/02 |
| | | | 359/356 |
| 2006/0153265 A1* | 7/2006 | Geiger | H01S 3/09415 |
| | | | 372/92 |
| 2008/0043134 A1* | 2/2008 | Christison | H01L 27/14601 |
| | | | 348/342 |

OTHER PUBLICATIONS

"Plexiglass, Optical & Transmission Characteristics", Plexiglass Acrylic Sheet, Altuglas International, Arkema Inc., Philadelphia, PA, 2000, http://www.plexiglas.com/export/sites/plexiglas/.content/medias/downloads/sheet-docs/plexiglas-optical-and-transmission-characteristics.pdf.

* cited by examiner

OPTICAL ASSEMBLY FOR PROTECTION OF OPTICAL DEVICES

CROSS REFERENCE TO RELATED APPLICATIONS

This application claims the benefit of Provisional Application Ser. No. 62/066,714 entitled "ENVIRONMENTAL PROTECTION FOR HIGH AVERAGE POWER INFRARED OPTICS", filed on Oct. 21, 2014, which is herein incorporated by reference in its entirety.

FIELD

Disclosed embodiments relate to optical assemblies and apparatus for improving the optical intensity induced damage limit of optical devices having optical materials, such as used in laser systems.

BACKGROUND

Precision infrared (IR) optical devices such as waveplates, achromatic waveplate sets, modulators, Faraday rotators, compensators, and prisms are generally fabricated from semiconductor crystalline materials (one type of optical material) and used with lasers. These optical devices frequently suffer from the inability to handle high-average power applications due large variations in bulk power handling and ultimately optical device failure from laser damage. This variation in power handling is often caused by the fluctuating bulk resistivity of the semiconductor crystal, stemming from environmental exposure to shorter wavelength non-pass band light that includes photons of sufficient energy to promote electrons from the valence band to the conduction band or other mid-bandgap states of the semiconductor crystal. The promotion of electrons to these excited states often causes an increase in the free charge carrier density (electrons and holes) within the semiconductor crystal, which results in greater infrared (IR) absorption of higher wavelength(s) pass band light. This increased IR absorption can lead to localized heating from exposure to the higher wavelength(s) of pass band light, ultimately sometimes leading to the catastrophic breakdown of the optical device in high average power applications.

Other optical devices fabricated from insulator (dielectric) optical materials often suffer from similar inabilities to handle high power applications due to absorption mechanisms including electron-avalanche-breakdown where a combination of photons of non-pass band light (both shorter and longer wavelengths than the pass band) with pass band light leads to a cascade of promoted electrons across the insulator band gap. This creation of charge carriers leads to the greater absorption of the high intensity pass band light and can ultimately lead to the catastrophic breakdown of the optical device. Likewise optical devices fabricated from electric conductor or semiconductor optical materials such as metal mirrors or heated germanium optics suffer from a similar inability to handle high power applications due to mechanisms including the direct absorption of free carriers from the photons of light interacting with the optic surface. The absorption of any light increases the surface temperature (pass band or non-pass band) and can ultimately lead to the destruction of the optical device.

Known approaches to mitigate this non-pass band light triggered carrier generation problem for optical devices including an optical material have generally been to reduce the average power to which the optical device is exposed or to minimize the device exposure to the non-pass band light. This can be achieved by lowering the average laser power, building a secondary enclosure to shadow a majority of the ambient light from reaching the surface of the optical material, or by simply requiring the operator or technician to use the optical system in a dark room with only the laser light present around the optical material.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include optical assemblies and protected optical devices (optical devices) that include an optical material (optical material) within a disclosed optical assembly. The optical assembly includes a crystal mount housing (housing), a first end window and a second end window that together with the housing provides an enclosed volume for the optical device. The optical device functionally allows operational pass band light (pass band light) to translate through its optical material (altered or unaltered) to an adjacent side where the pass band light is either utilized or further manipulated. The material for the end windows is selected to block essentially all non-pass band wavelengths which has sufficient energy to generate absorption mechanisms in the optical material (non-pass band light), while transmitting essentially all of the pass band light. The material for the housing is also selected to block essentially all the non-pass band light from reaching the optical material.

As used herein the term "optical material" can be a single crystal, polycrystalline material, or an optically transparent amorphous material such as a glass material. A polycrystalline material includes a plurality of crystallites generally of varying size and crystal orientation, where crystallites are also commonly referred to as grains. The boundaries between crystallites are referred to as ground boundaries. The size of the crystallites for disclosed polycrystalline embodiments can be nanoscale, or larger such as microscale.

BRIEF DESCRIPTION OF THE DRAWINGS

Reference will now be made to the accompanying drawings, which are not necessarily drawn to scale, wherein.

DETAILED DESCRIPTION

Figure 1A:
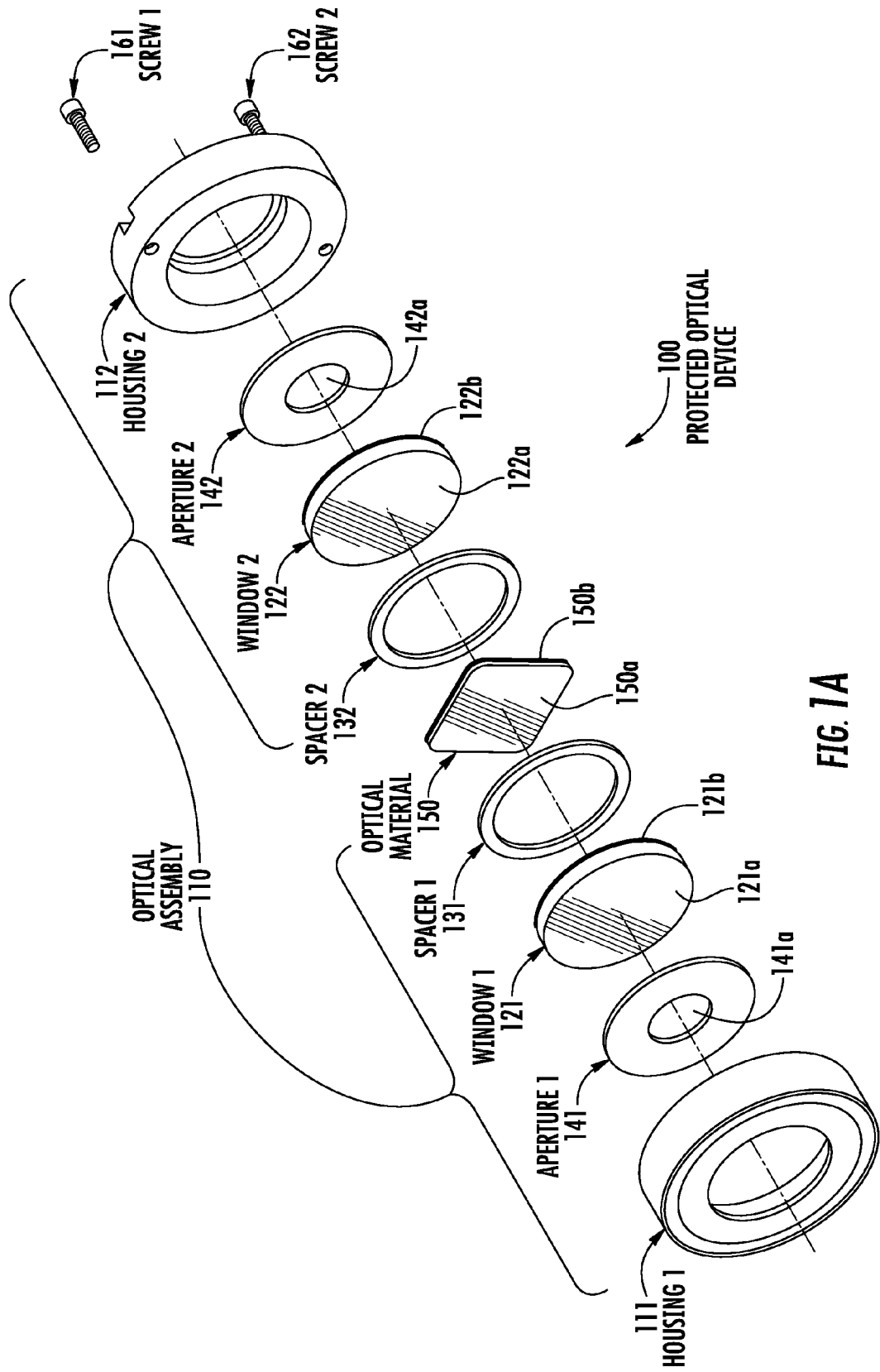
FIG. 1A is an exploded view of an example protected optical device including an optical assembly comprising at least two housing components and a first end window a second end window that together provide an enclosed volume in which the optical device comprising an optical material fits within, where the respective components are screwed together, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Disclosed embodiments recognize prior solutions to the non-pass band light triggered carrier generation and the resulting absorption problem for optical devices including optical material requires the user of the optical system (e.g., laser system) to either utilize lower average power, build a secondary enclosure to shadow most of the non-pass band light from contacting the surfaces of the optical material, or to operate the optical system in the dark. Lowering the average power of the optical system can significantly reduce the heating effects of the optical material, however, lowering the average power of the optical device can decrease the functionality of the overall system for many applications.

A secondary enclosure besides the housing such as a beam line enclosure tube ensures the surfaces of the optical material are shadowed from non-pass band light, being the most common approach, but does not protect the optical device from pump light such as present in a laser diode-pumped laser system (such as shown in the laser diode-pumped laser system in FIG. 2 described below) while requiring a greater investment on the part of the user in addition to preventing maintenance and calibration while the optical system is online. Likewise, using the optical system in the dark also prevents maintenance of the optical system which increases the danger of operating the system because the technicians or operators can no longer see what they are doing. This approach also does not protect the optical device in the case of a laser diode-pumped laser system from pump light generated from the operation of the laser source.

FIG. 1A shows a cross sectional depiction of an example protected optical device 100 comprising an optical assembly 110 including two crystal mount housing components (housing components) 111 and 112 which are generally cylindrically-shaped enclosing a first end window 121 and a second end window 122 on the ends of the housing components 111 and 112 that together provide an enclosed volume for an optical material 150 of an optical device, according to an example embodiment. The first end window 121 and second end window 122 are shown as being aperture-less and uncurved (planar). Although two housing components 111 and 112 are shown, more than two housing components may be utilized, such as 4, 6 or 8 housing components.

The optical material 150 generally has a pair of anti-reflection (AR) coatings 150a and 150b on its input and output faces. Likewise the material for the first end window 121 and a second end window 122 will also generally have a pair of AR coatings on their input and output faces shown as 121a, 121b, and 122a and 122b. Apertures 141 and 142 have a center hole or opening 141a and 142a (respectively) through which pass band wavelength light travels over the end windows 121 and 122. The first end window 121, second end window 122, optical material 150, apertures 141 and 142, and spacers 131 and 132 are compressed together within the housing components 111 and 112 and held in compression by fasteners shown as screws 161 and 162 in FIG. 1A that mate with threading in the housing components 111 and 112 to screw the housing together so that the respective components are pressed together in physical contact. However, other fasteners may be used such as adhesives, or bolts and nuts. As described below, the optical material 150 is physically separated from the end windows 121 and 122 by spacers 131 and 132.

The optical material 150 can comprise a non-linear optical (NLO) material. A NLO material allows the associated optical device to provide optical harmonic generation, optical parametric amplification, optical parametric oscillation or non-linear optical scattering for generation of other optical wavelengths (e.g., utilizing Brillouin or Raman). The enclosed space between the housing components 111 and 112 can also be expanded and electrical connections can be made through the housing to facilitate the use of AO or EO devices. A standard Bayonet Neill-Concelman (BNC) connector formed in the sidewalls of housing components 111 and/or 112, for example, can be used to allow electrical input without allowing non-pass band light from interacting with the optical material 150. The BNC connectors can then be wired to the electrodes on the AO or EO optical material within the enclosed volume of the body and windows. The housing can furthermore be modified to include magnets for use in magneto-optic (MO) devices such as faraday rotators. The optical device can also comprises passive optics such as a waveplate (WP) or a prism.

The material for the end windows 121 and 122 is selected is based on the pass band wavelength of the optical system generally set by the laser or other light source, and so that it blocks essentially all (define herein to be a maximum of 5% transmission of wavelengths in this range) non-pass band light (e.g., ambient light and/or pump light) recognized to be detrimental to the operation of the specific optical material 150 in the optical device. For the example of an IR optical device comprising a semiconductor optical material, the material for the end windows 121 and 122 can comprise ZnSe, ZnS, Ge, GaAs, or CdTe.

There is a counterbore and physical rim on each housing component 111 and 112 as shown in FIG. 1A that retains the optical assembly 110 that is compressed by the screws 161 and 162 shown on the right side of the housing component 112, used to maintain the overall compression of the optical assembly. The material of the apertures 141, 142 does not affect the transmission of light to the optical material 150 because the apertures 141 and 142 are external of the windows 121 and 122 that as described above function to block essentially all of the incident non-pass band light. The design shown in FIG. 1A allows building optics with various sizes (generally ranging from 4 mm to 42 mm diameters) of the apertures 141 and 142 within the same housing which has the benefit of reducing material and machining costs across the product line.

The material for the housing components 111, 112 is also selected so that it blocks essentially all (at least 95% of the photons of) of the non-pass band light from reaching the optical material 150, typically being ≤2,000 nm. By the housing components 111, 112 and end windows 121 and 122 both blocking essentially all incident non-pass band light from reaching the optical material 150, disclosed optical assemblies address the non-pass band light triggered carrier generation problem leading to increased absorption for optical devices as well as mid-bandgap vibrational modes, photo-induced damage, and other absorption mechanisms.

The end windows 121 and 122 shown in FIG. 1A are spaced apart sufficiently from the optical material 150 by spacers 131 and 132 to achieve physical separation so that they are not in physical contact or in close proximity from one another. This separation helps preserves the AR coatings that are generally on both the optical material 150 shown as 150a and 150b, and on the end windows 121, 122. It is recognized that since optical contact is not easily routinely achieved with all optical materials, the spacing and proper AR coatings for the wavelength of operation help prevent scatter from internal reflections of the beam. The spacers 131 and 132 can comprise an elastomer or other material generally in a ring shape having a hollow center.

As noted above, the choice of material for the end windows 121 and 122 is based on the pass band (operational wavelength) of the system generally set by the laser or other light source. As an example, for most IR optics, namely optical devices constructed from CdS, CdSe, and CdTe semiconductor crystals with optical band gaps of 512 nm, 712 nm and 861 nm respectively, end windows 121, 122 comprising of amorphous material transmitting infrared radiation (AMTIR) are recognized as being effective because their transparency at operational IR wavelengths greater than 1 µm, and opaque nature across shorter wavelengths (e.g., less than 1 µm). Other IR optic example materials for the end windows 121 and 122 can include ZnSe, ZnS, Ge, GaAs, CdTe, and other amorphous materials transmitting infrared radiation similar to AMTIR-1 $Ge_{33}As_{12}Se_{55}$ glass. The effect of the reducing transmission of visible and near IR light prevents the generation of absorption mechanisms within the optical material 150 and therefore prevents an unwanted decrease in the optical material's bulk resistivity and an unwanted increase in IR absorption.

Regarding the choice of materials for the housing components 111 and 112, materials that are opaque to the wavelengths of light that are high enough in energy to create absorption phenomena in the optical material 150 of the optical device may be used, such as metals or dense opaque plastics. The housing components 111 and 112 generally have no mounting or indexing holes or junctions (e.g., electrical inputs for EO applications, sensors, or mating body parts) that are recognized to allow ambient light having sufficient energy or power to facilitate the absorption of light by the optical material 150 at the pass band for the optical device comprising the optical material 150.

If necessary the enclosed space between the housing components 111 and 112 can also be expanded and connections can be made through the housing to facilitate active devices inputs. As disclosed above, a standard BNC connector, for example, can be used to allow electrical input without allowing ambient non-pass band light from interacting with the optical material 150. The seals between the windows 121 and 122, defined as junctions that do not allow the transmission of light, are typically made mechanically either by the compression of an opaque elastomeric material or other opaque sealant material.

The lower absorption provided by disclosed optical devices to contained optical assemblies in comparison to conventional optical devices that do not protect the optical device from non-pass band light, allows the optical device to be utilized at power levels that would otherwise melt or destroy it. Disclosed optical devices having housings using housing materials such as metal or dense opaque plastics can eliminate the need to operate the optical device in a dark environment, remove the customer's cost of a separate enclosure, and allow technicians or operators to maintain, calibrate, and operate the laser system in a lighted environment. The housing material may also comprise a ceramic or an opaque glass.

Figure 1B:
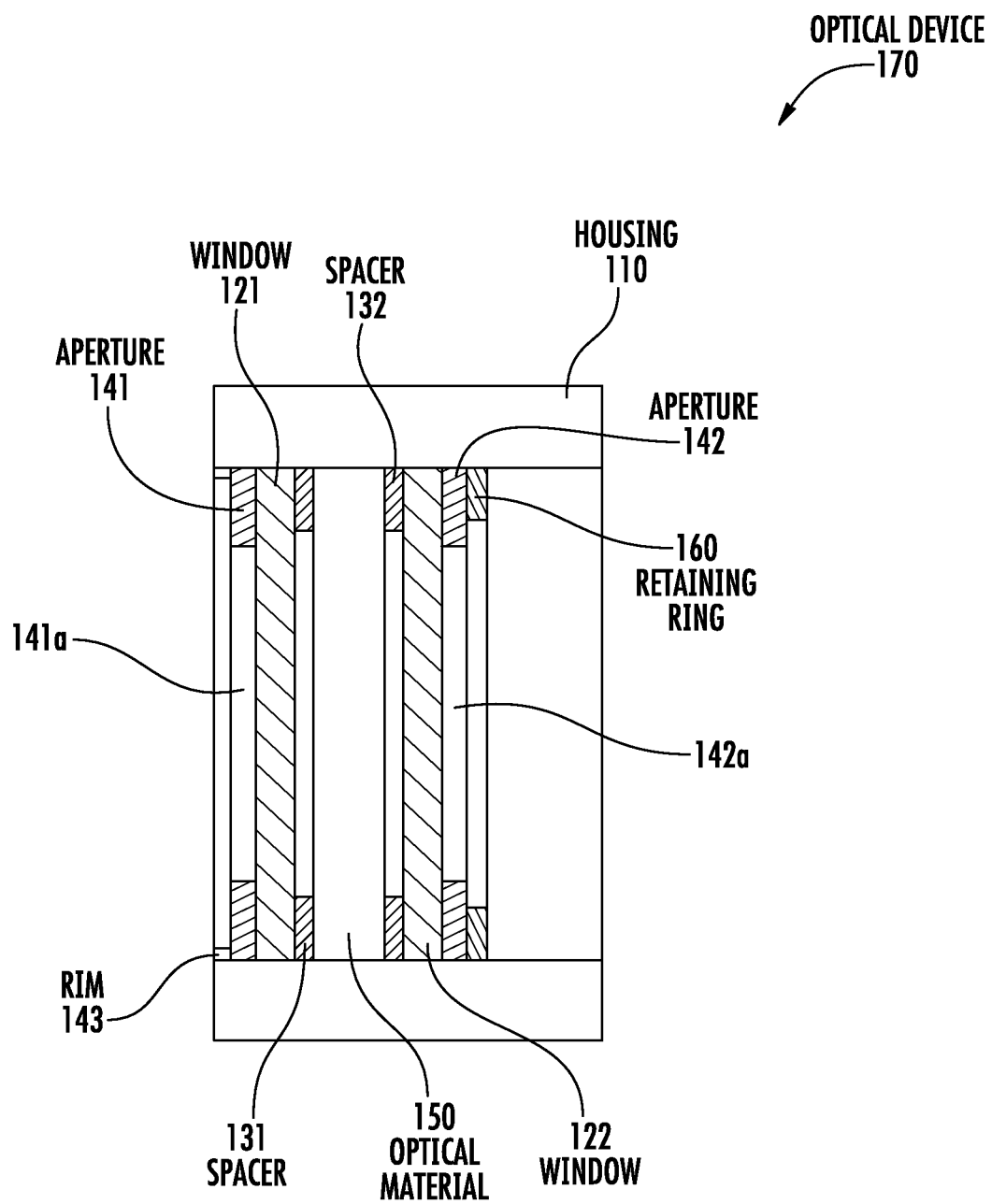
FIG. 1B shows a cross sectional depiction of an example protected optical device including an optical assembly comprising housing components including a first end window and a second end window that together provide an enclosed volume in which an optical device comprising an optical material fits within, where the optical assembly is held together by a retaining ring for providing compression of the optical assembly against a physical rim, according to an example embodiment.

FIG. 1B shows a cross sectional depiction of an example optical device 170 including an optical assembly comprising housing components 111, 112 and a first end window 121 and a second end window 122 that together provide an enclosed volume in which an optical device comprising an optical material 150 fits within, where the optical assembly is held together by a retaining ring 160, according to an example embodiment. The retaining ring 160 provides compression of the optical assembly against a physical rim 143.

Figure 2:
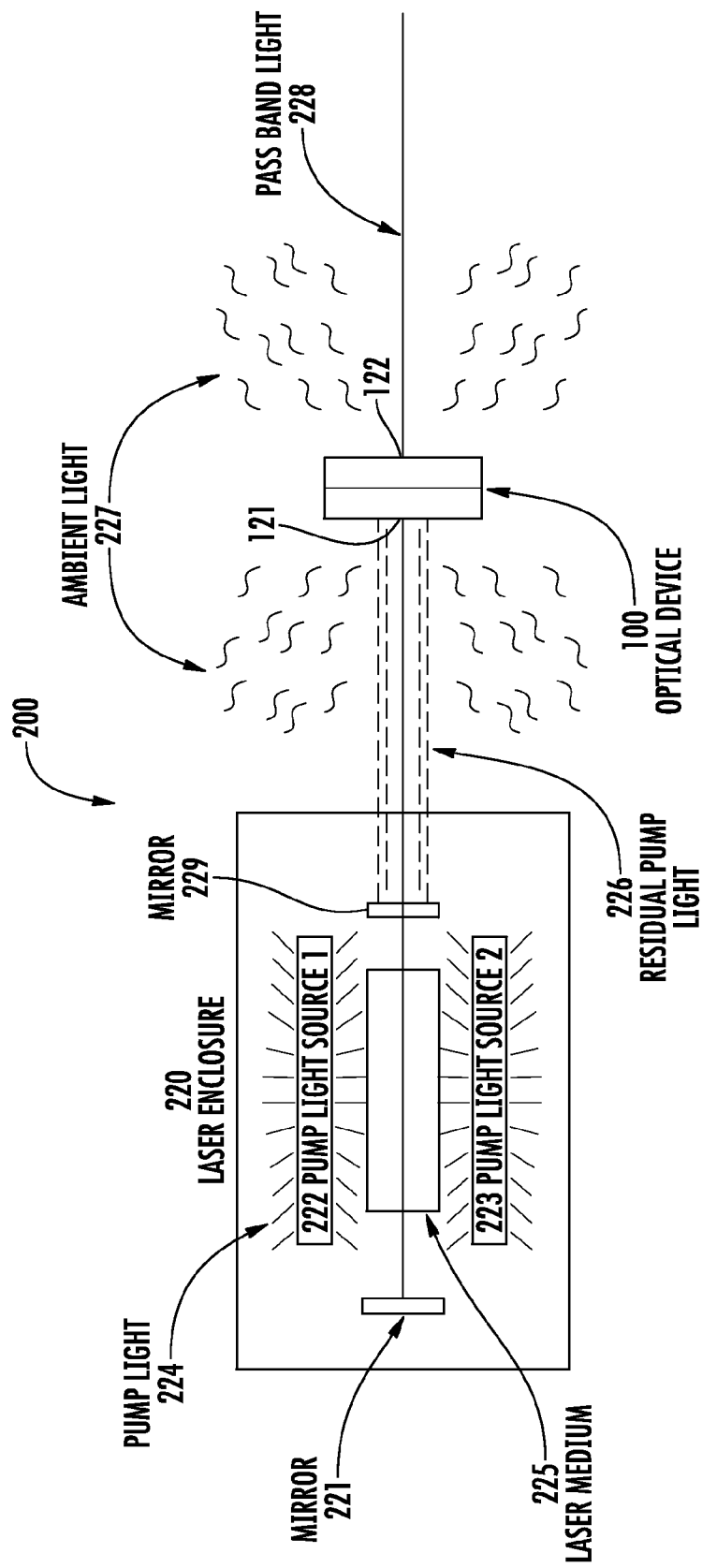
FIG. 2 shows an example laser system having a pair of pump light sources pumping a laser source together with the protected optical device shown in FIG. 1A placed external to the laser cavity.

As noted above, disclosed optical assemblies can benefit a variety of optical devices having optical materials 150, such as waveplates, modulators, Faraday rotators, compensators, and passive optics such as prisms. FIG. 2 shows a laser system 200 having an example optical device 100 mounted extra-cavity to a laser enclosure 220 having first and second pump light sources (e.g., laser diode bars) 222, 223 pumping a laser medium 225 within a laser cavity defined by a highly reflective rear mirror 221 and out coupler mirror 229. However, optical device 100 can be used intra-cavity as well.

The optical axis of the optical material of the optical device 100 is aligned with respect to the laser input beam that provides the pass band light 228. In one embodiment the laser system 200 may operate at an IR wavelength between 1.2 µm and 15 µm. FIG. 2 also illustrates the exposure of the protected optical device 100 to both incident ambient light 227 and residual pump light 226 from the laser system 200. The exposure of the optical device 100 to the residual pump light 226 in an intra-cavity configuration would still generally be present even though the ambient light 227 may be suppressed. As described above, the end windows 121 and 122 shown provide transparency for the pass band light 228 but block the non-pass band light including both the ambient light 227 and residual pump light 226 from reaching the optical material of the optical device 100. A common pump light source for laser systems is a xenon flash lamp that provides light ranging from 200 nm to 1100 nm, while the laser system 200 operates at a higher wavelength compared to the pump light source, such as 1064 nm or around 1535 nm.

EXAMPLES

Disclosed embodiments are further illustrated by the following specific Examples, which should not be construed as limiting the scope or content of this Disclosure in any way.

An example optical device is a 1 mm to 2 mm thick CdS waveplate which can comprise the semiconductor crystal as the optical material 150 shown in FIG. 1A having 50 mm diameter external housing components 111 and 112 made from anodized aluminum. The optical assembly 110 can include 1.5 mm thick alumina ($Al_2O_3$) apertures 141 and 142, 0.8 mm thick Viton elastomeric spacers (131 and 132), and 2 mm thick AMTIR end windows 121 and 122. CdS has an optical band gap of 512 nm. The optical assembly is held within the housing components 111 and 112 with compression from screws 161 and 162. As described above, the AMTIR end windows 121 and 122 provide transparency at conventional operational IR wavelengths (pass band) that are generally greater than 1 µm, and opaqueness across wavelengths less than 1 µm to protect the CdS waveplate from non-pass band light triggered carrier generation problems. The anodized aluminum housing components 111 and 112 blocks essentially all light at wavelengths less than 1 µm from reaching the CdS waveplate.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. A laser system, comprising:
   a laser source including a laser cavity between a highly reflective rear mirror and an output coupler having a laser medium therein for generating a laser beam providing pass band light, and
   a protected optical device including an optical material within an enclosed volume for processing said pass band light, comprising:
      an optical assembly including at least two housing components, a first end window, a second end window, said first end window and said second end window together with said housing components providing said enclosed volume for said optical device;
      wherein said first end window and said second end window are spaced apart from said optical material;
      wherein a material for said end windows blocks light outside said pass band having sufficient energy to generate absorption phenomena in said optical material while transmitting essentially all said pass band light, and
      wherein a material for said housing components blocks essentially all non-pass band light having sufficient energy to generate absorption phenomena in said optical material including visible light from reaching said optical material.

2. The laser system of claim 1, wherein said optical material comprises a semiconductor crystal.

3. The laser system of claim 1, further comprising at least one pump light source for optically pumping said laser source.

4. The laser system of claim 1, further comprising fasteners for compressing together said housing components.

5. The laser system of claim 1, wherein said optical material, said first end window and said second end window all include anti-reflective (AR) coatings for reducing reflection of said pass band light.

6. The laser system of claim 1, wherein said first end window and said second end window both comprise an amorphous material transmitting infrared radiation (AMTIR).

7. The laser system of claim 1, wherein said first end window and said second end window comprise Ge, GaAs, or CdTe.

8. The laser system of claim 1, wherein said material for said housing components comprises a metal, plastic, ceramic, or a glass that is opaque to said non-pass band light.

9. The laser system of claim 1, wherein said optical device comprises a non-linear optical (NLO) device, an electro-optic (EO) device, an acousto-optic (AO) device, a magneto-optic (MO) device, a waveplate (WP), or a prism.

10. The laser system of claim 1, wherein said optical assembly is extra-cavity relative to said laser source.

* * * * *